United States Patent
Milligan et al.

(10) Patent No.: US 11,816,158 B2
(45) Date of Patent: Nov. 14, 2023

(54) METADATA TAGGING OF DOCUMENT WITHIN SEARCH ENGINE

(71) Applicant: MICRO FOCUS LLC, Santa Clara, CA (US)

(72) Inventors: David Milligan, Santa Clara, CA (US); Dermot Hardy, Belfast (GB)

(73) Assignee: Micro Focus LLC, Santa Clara, CA (US)

( * ) Notice: Subject to any disclaimer, the term of this patent is extended or adjusted under 35 U.S.C. 154(b) by 226 days.

(21) Appl. No.: 16/951,178

(22) Filed: Nov. 18, 2020

(65) Prior Publication Data

US 2022/0156331 A1    May 19, 2022

(51) Int. Cl.
*G06F 16/901* (2019.01)
*G06F 16/907* (2019.01)

(52) U.S. Cl.
CPC .......... *G06F 16/901* (2019.01); *G06F 16/907* (2019.01)

(58) Field of Classification Search
None
See application file for complete search history.

(56) References Cited

U.S. PATENT DOCUMENTS

| | | | |
|---|---|---|---|
| 8,131,762 B2 | 3/2012 | Smetters et al. | |
| 10,409,779 B2 | 9/2019 | Bhattacharjee | |
| 2008/0222513 A1 | 9/2008 | Van Den Berge | |
| 2010/0274790 A1 | 10/2010 | Hong et al. | |
| 2012/0304247 A1 | 11/2012 | Badger et al. | |
| 2014/0280284 A1* | 9/2014 | Emanuel | G06F 16/951 707/766 |

OTHER PUBLICATIONS

Li, Yuan, et al., "Final Report CS 5604: Information Storage and Retrieval", Elasticsearch Team, Virginia Polytechnic Institute and State University, Jan. 6, 2020, 57 pages. (Year: 2020).*
Karevoll, Njal, "Document Processing and Elasticsearch", Nov. 13, 2014 <https://www.elastic.co/blog/found-document-processing>.
Update API https://www.elastic.co/guide/en/elasticsearch/reference/current/docs-pdate.html, as accessed and saved by Internet Archive Wayback Machine on Nov. 20, 2019.

* cited by examiner

*Primary Examiner* — Scott A. Waldron
(74) *Attorney, Agent, or Firm* — Sheridan Ross P.C.

(57) ABSTRACT

A shard of a selected document is identified. A hierarchy of documents including the selected document are to be tagged with metadata in a data store of a search engine so that the related documents are queryable by the metadata using the search engine. The shard specifies a location of the related documents within the data store of the search engine. For each related document, a tagging operation is generated within a script, the tagging operation specifying the metadata, the shard, an identifier of the related document, and an identifier of the selected document. The script including the generated tagging operation for each related document is transmitted to the search engine to execute to tag the related documents in the data store with the metadata and with the selected document as a source of the metadata.

20 Claims, 6 Drawing Sheets

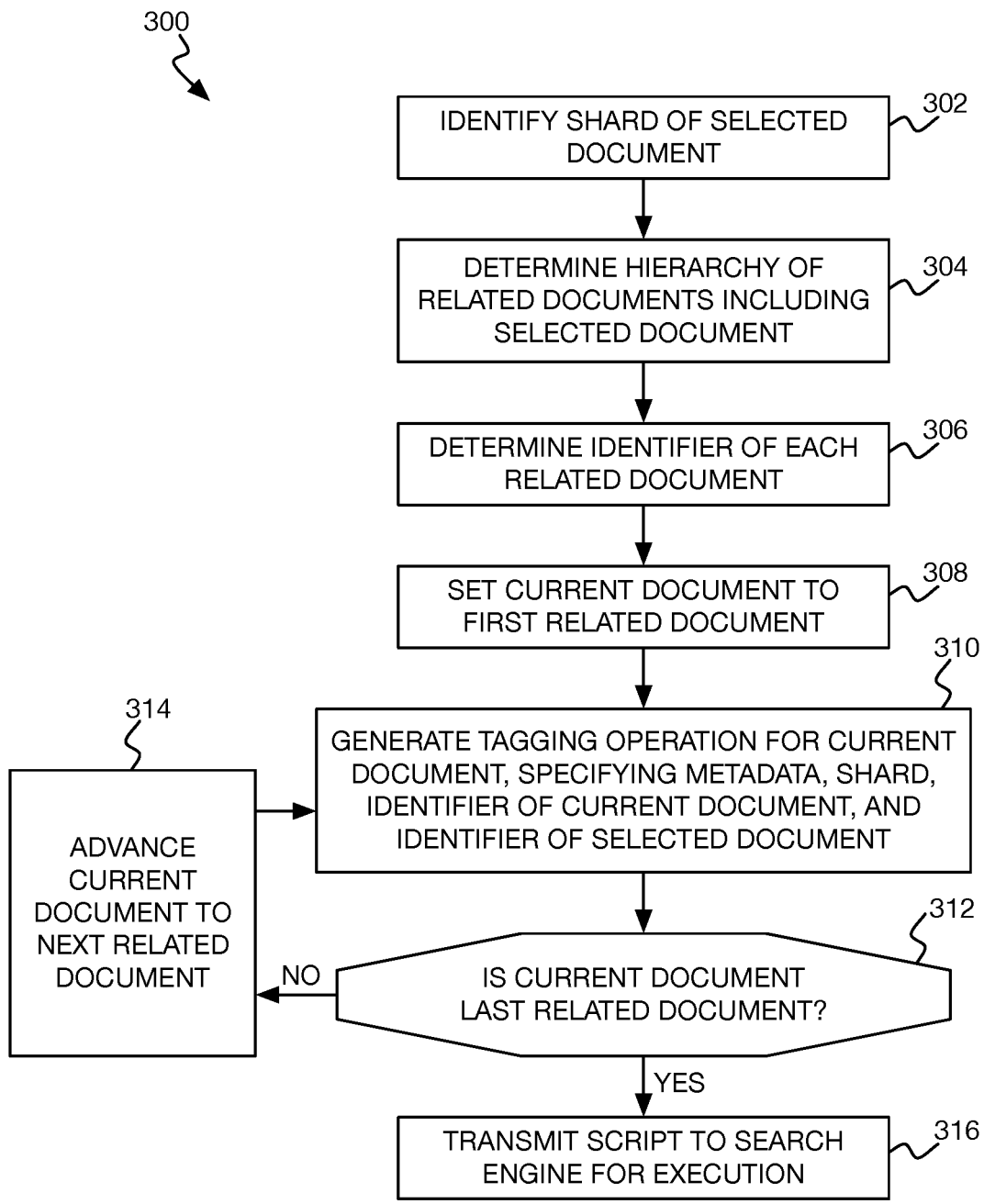

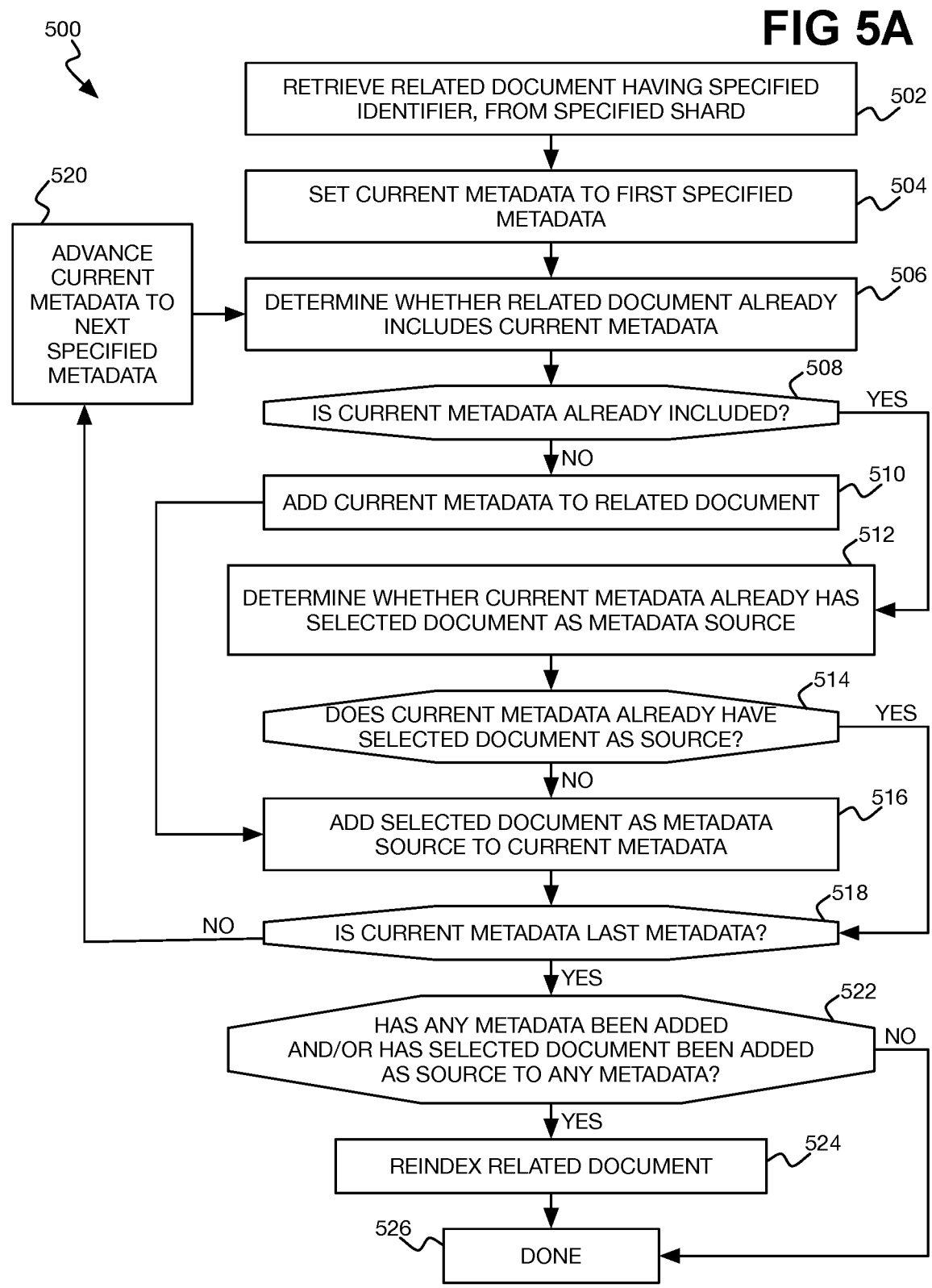

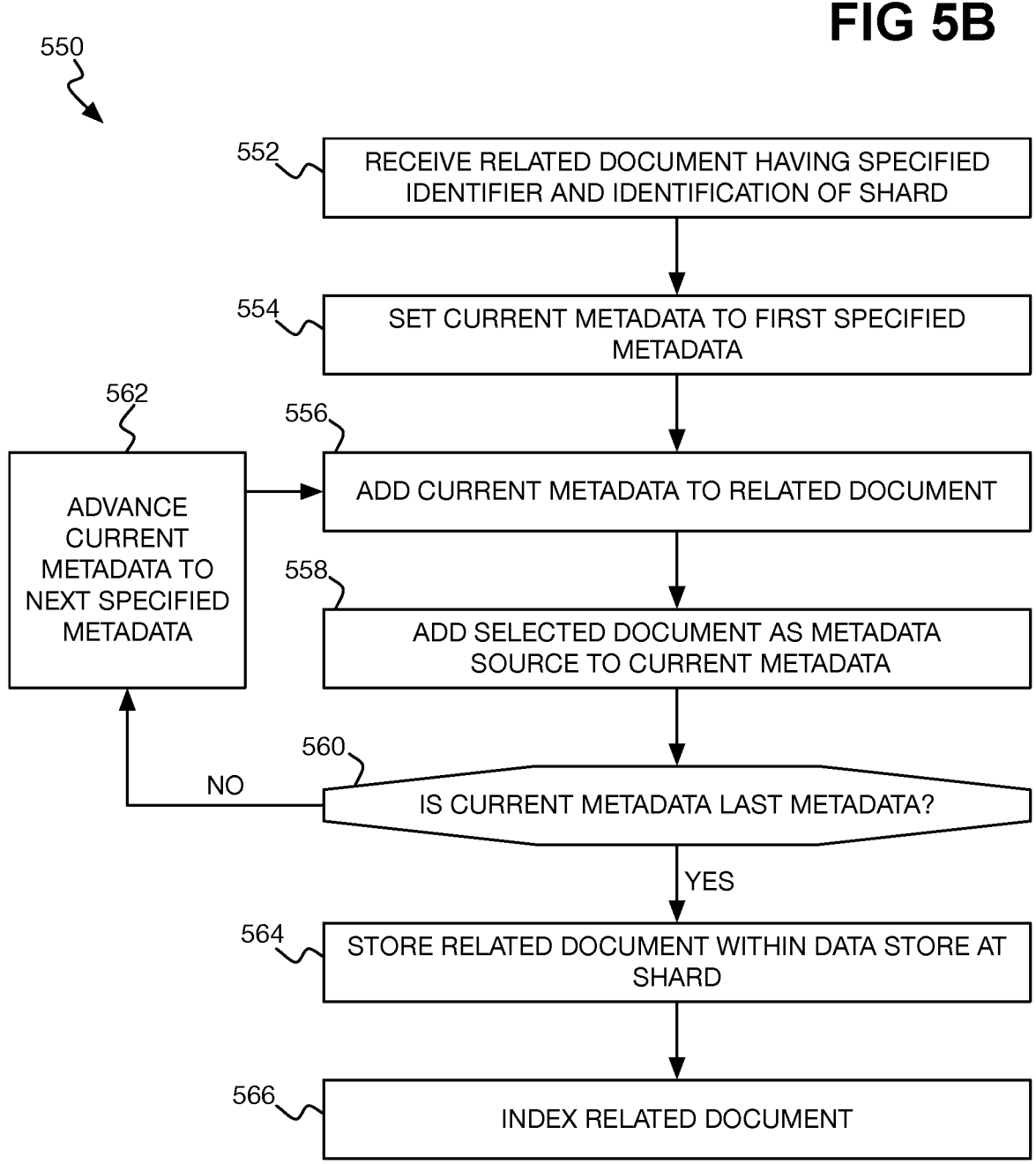

METADATA TAGGING OF DOCUMENT WITHIN SEARCH ENGINE

BACKGROUND

Data is the lifeblood of many entities like business and governmental organizations, as well as individual users. Large amounts of data are often generated or collected by computing devices and their users and stored in individual documents, or files. The documents can be subjected to various analytics in order to glean insights into the information they contain.

BRIEF DESCRIPTION OF THE DRAWINGS

FIG. 3 is a flowchart of an example method for generating a script to tag a hierarchy of related documents with metadata in a data store of a search engine and with a selected document of the related documents as a source of the metadata.

FIG. 5A is a flowchart of an example method for executing a tagging operation of a generated script to tag a related document of a hierarchy of related documents with metadata in a data store of a search engine and with a selected document of the related documents as a source of the metadata, in a case in which the related documents are already stored in the data store.

FIG. 5B is a flowchart of an example method for executing a tagging operation of a generated script to tag a related document of a hierarchy of related documents with metadata in a data store of a search engine and with a selected document of the related documents as a source of the metadata, in a case in which the related documents are not yet stored in the data store.

DETAILED DESCRIPTION

As noted in the background, entities as well as individual users can have large amounts of data stored in individual documents. In order to perform queries and other analytics against the documents, the documents may be provided to a search and analytics engine for storage and indexing. For instance, the search engine may permit the documents to then be searched in a similar manner as the Internet is searched using publicly available Internet search engines. An example of such a search and analytics engine that can store and index documents for subsequent querying and analytics is the ELASTICSEARCH open source distributed search and analytics engine, which is built on the APACHE LUCENE open source search engine.

To improve the ability of a search engine to return relevant documents in satisfaction of search queries, the documents may be tagged with metadata, including file type, data created, data modified, owner, and so on. However, simply providing documents to a search engine like the ELASTICSEARCH search engine does not result in their being tagged with metadata, which can limit the usefulness of employing such a search engine. Rather, documents have to be tagged with metadata either before the documents are provided to the search engine for storage and indexing, or have to be tagged with metadata and reindexed after the documents have already been stored in the search engine.

Techniques described herein provide for metadata tagging of documents within a search engine, by generating a script that is transmitted to and executed by the search engine. The script may be generated in the Painless scripting language that the ELASTICSEARCH search engine natively supports. The script includes tagging operations that each correspond to a document to be tagged with metadata. A tagging operation instructs the search engine to add the metadata to a document just if the document does not already include the metadata, and to add a specified metadata source just if the document does not already include the specified metadata source. A tagging operation further instructs the search engine to reindex the document just if the metadata and/or the specified metadata source were added.

Figure 1:
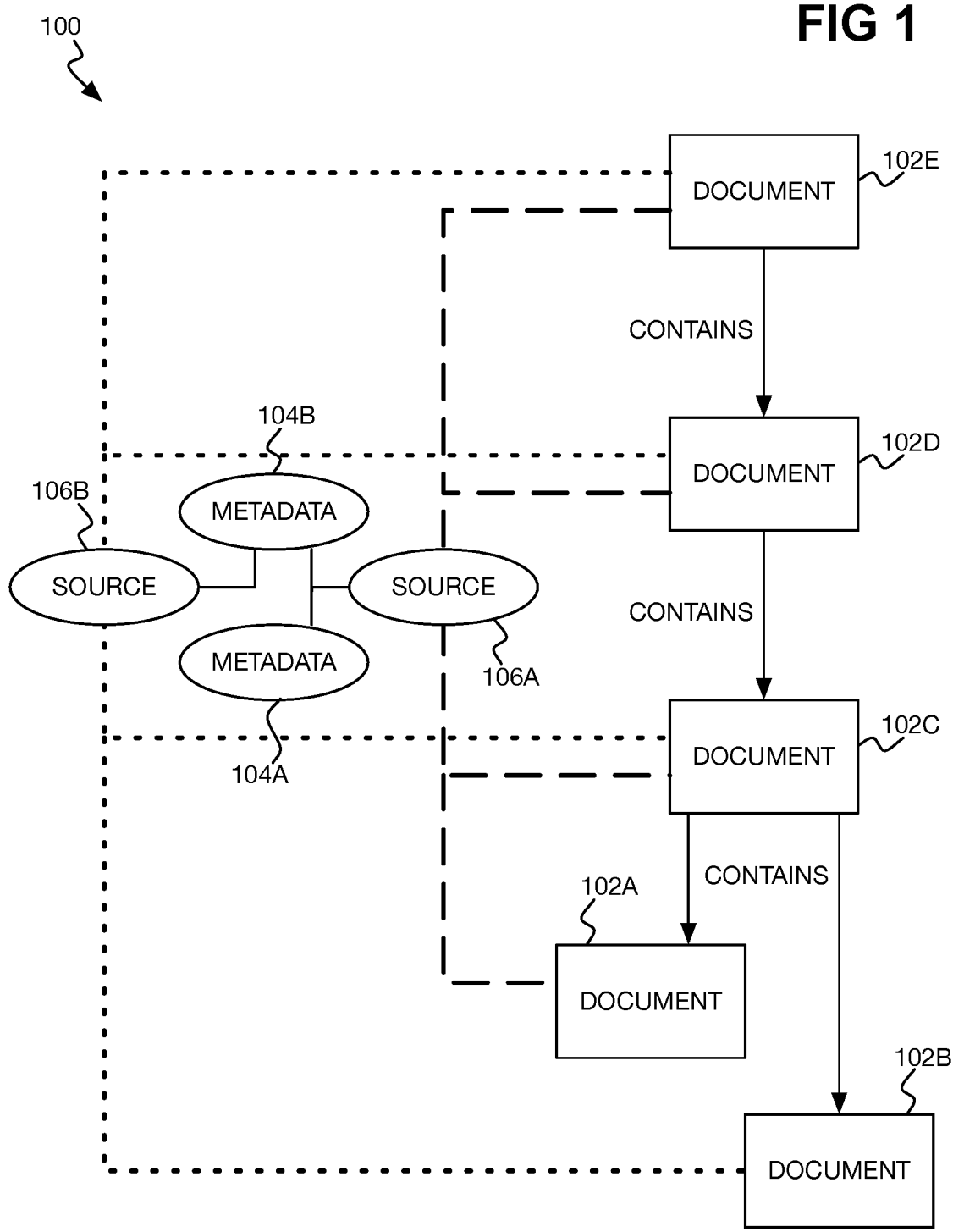
FIG. 1 is a diagram of an example hierarchy of related documents that have been tagged with metadata.

FIG. 1 shows an example hierarchy 100 of related documents 102A, 102B, 102C, 102D, and 102E, which are collectively referred to as the related documents 102. The documents 102 may be related in that each lower document 102 in the hierarchy 100 is contained by a higher document 102 in the hierarchy 100. For example, the document 102E may be a personal storage table (PST) file used by some email messaging programs and personal information management programs to store email messages and other data. The document 102E may contain the document 102D, which may be an individual email message.

The document 102D may in turn contain the document 102C, which may be an attachment to the email message, such as a word processing document. The document 102C may itself contain both the documents 102B and 102A. For example, the document 102B may be a spreadsheet, whereas the document 102A may be an image. Each of the documents 102A and 102B is thus contained by the ancestral documents 102C, 102D, and 102E within the hierarchy 100. However, the document 102A does not contain the document 102B, and vice-versa.

In the example of FIG. 1, the documents 102 have been selectively tagged with metadata 104A and 104B, which are collectively referred to as the metadata 104. Specifically, the documents 102 have been selectively tagged with the metadata 104A having a source 106A, and have been selectively tagged with the metadata 104B having both the source 106A and a source 106B, which are collectively referred to as the sources 106. A source 106 of a metadata 104 may identify the document 102 responsible for the metadata 104. For example, the source 106A may correspond to the document 102A, and the source 106B may correspond to the document 102B.

Therefore, as to the metadata 104A having the source 106A (i.e., the document 102A), the documents 102A, 102C, 102D, and 102E are tagged. The document 102A is tagged with the metadata 104A having the source 106A because document 102A is the source 106A. The documents 102C, 102D, and 102E are each tagged with the metadata 104A having the source 106A because the documents 102C, 102D, and 102E contain the document 102A. The metadata 104A may indicate that each such tagged document 102 is or contains an image in the case in which the document 102A is an image, for instance.

Each of the documents 102 is tagged with the metadata 104B. As to the source 106A (again, the document 102A) of the metadata 104B, the documents 102A, 102C, 102D, and 102E are tagged. As with the metadata 104A having the source 106A, the document 102A is tagged with the metadata 104B having the source 106A because the document 102A is the source 106A. The documents 102C, 102D, and 102E are each tagged with the metadata 104B having the source 106A because the documents 102C, 102D, and 102E contain the document 102A.

As to the source 106B (i.e., the document 102B) of the metadata 104B, the documents 102B, 102C, 102D, and 102E are tagged. The document 102B is tagged with the metadata 104B having the source 106B because the document 102B is the source 106B. The documents 102C, 102D, and 102E are each tagged with the metadata 104B having the source 106B because the documents 102C, 102D, and 102E contain the document 102B.

Therefore, the documents 102C, 102D, 102E are each tagged with the metadata 104B having both the sources 106. The document 102A is tagged with the metadata 104B just as to the source 106A and the document 102B is tagged with the metadata 104B just as to the source 106B. The metadata 104B may indicate that each such tagged document 102 is or contains a particular collection of documents.

If a source 106 of a metadata 104 is removed, the metadata 104 remains if there is any other source 106 of the metadata 104, and the metadata 104 is removed if there is no other source 106 of the metadata 104. For example, if the source 106A is removed from the metadata 104A, then the metadata 104A is removed from each of the documents 102A, 102C, 102D, and 102E because the source 106A is the only source of the metadata 104A. Therefore, no document 102 still includes the metadata 104A.

By comparison, if the source 106A is removed from the metadata 104B, the metadata 104B remains on each of the documents 102C, 102D, and 102E because the metadata 104B also has the source 106B on the documents 102C, 102D, and 102E. (The metadata 104B on the document 102B is not affected, because it already has just the source 106B.) However, the metadata 104B is removed from the document 102A because the source 106A is the only source of the metadata 104B on the document 102A.

Figure 2:
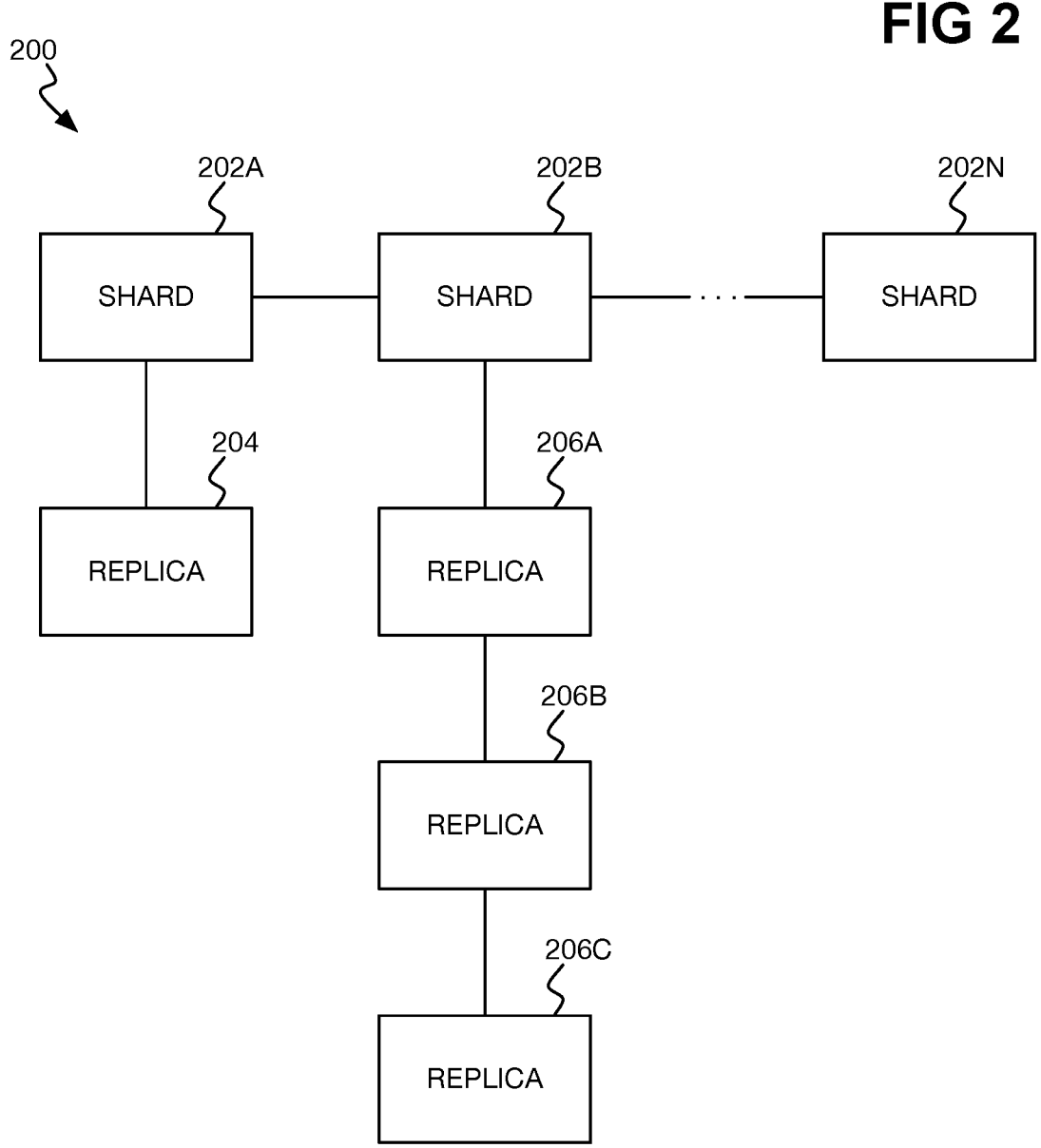
FIG. 2 is a diagram of an example data store of a search engine.

FIG. 2 shows an example data store 200 of a distributed search engine. The data store 200 is the logical representation of the physical storage devices on which the search engine stores documents. In the example of FIG. 2, the data store 200 is horizontally partitioned over shards 202A, 202B, . . . , 202N, which are collectively referred to as the shards 202. The search engine stores each unique document in just one horizontally partitioned shard 202. Furthermore, the search engine stores related documents, such as documents of the same hierarchy like the related documents 102 of the hierarchy 100 in the example of FIG. 1, in the same shard 202.

However, a shard 202 may have one or multiple replicas, which can be considered a vertical partitioning of the data store 200. Each replica of a shard 202 is a copy of the shard 202, and thus stores the same documents as the shard 202 in question. In the example of FIG. 2, the shard 202A has one replica 204, and therefore both the shard 202A and the replica 204 store the same documents. The shard 202B has three replicas 206A, 206B, and 206C, which each store the same documents as the shard 202B. The shard 202N has no replicas.

FIG. 3 shows an example method 300 for generating a script to tag a hierarchy of related documents with metadata in a data store of a search engine and with a selected document of the related documents as a source of the metadata. The method 300 is described in relation to one selected document, where the selected document is a source of the metadata. However, the method 300 is applicable to multiple selected documents being sources of the (same or different) metadata. The method 300 is particularly described in relation to the hierarchy 100 of related documents 102 of FIG. 1, with the document 102A being the selected document. The method 300 is therefore further particularly described in relation to metadata 104A and 104B of which the document 102A is the source 106A.

The method 300 can be implemented as program code stored on a non-transitory computer-readable data storage medium and executable by a processor of a computing device. For example, the computing device may be a desktop, laptop, or notebook computer that is communicatively connected to one or multiple other computers, such as servers, that run the search engine. For instance, the search engine may be deployed or implemented using a software as a service (SaaS) or cloud-computing model, in which case the computing device may access the search engine over a network at a particular network address.

The method 300 includes identifying the shard 202 of the selected document 102A, and thus of all the related documents 102 of the hierarchy 100 (302). How the shard 202 of the selected document 102A is identified depends on whether the related documents 102 (including the selected document 102A) are already stored in the data store 200 of the search engine. An example approach for identifying the shard 202 of the selected document 102A in the case in which the related documents 102 are already stored by the search engine is presented later in the detailed description, as is an example approach for identifying the shard 202 in the case in which the related documents 102 are not yet stored.

The method 300 can include determining the hierarchy 100 of the related documents 102 including the selected document 102A (304). For example, the selected document 102A may have a hierarchical path through the hierarchy 100 and thus which specifies the hierarchy 100 as it pertains to the selected document 102A. The hierarchical path of the selected document 102A may specify that the selected document 102A is contained by the document 102C, that the document 102C is contained by the document 102D, and that the document 102D is contained by the document 102E. Therefore, the hierarchy 100 as it pertains to the selected document 102A can be determined by identifying the hierarchical path of the document 102A.

The method 300 can include determining the identifier of each related document 102 (including the selected document 102A) of the hierarchy 100 as it pertains to the selected document 102A (306). The identifier of a document 102 may uniquely identify the document within the file system of the data store 200 of the search engine. In specifying that the document 102E contains the document 102D, which contains the document 102C, which contains the document 102A, the hierarchical path of the selected document 102A may include the identifier of each of the documents 102A, 102C, 102D, and 102E. The identifier of each such related document 102, including the selected document 102A, may thus be determined by extracting the identifier from the hierarchical path of the document 102A.

The method 300 can include setting a current document to the first related document 102 of the hierarchy 100 as it pertains to the selected document 102A (308). For example, the first such related document 102 may be the document 102E, the second related document 102 may be the document 102D, the third related document 102 may be the document 102C, and the fourth and last related document 102 may be the selected document 102A itself. As another example, the first related document 102 may be the selected document 102A itself, the second related document 102 may be the document 102C, the third related document 102 may be the document 102D, and the fourth and last related document 102 may be the document 102E.

The method 300 includes generating a tagging operation within a script for the current document (310). The tagging operation specifies the shard 202 of the data store 200 in which the current document is or is to be stored, which is the shard 202 of the selected document 102A. That is, the shard 202 is the selected horizontal partition of the horizontal partitions in which the related documents 102 of the hierarchy 100 are stored in the data store 200. The shard 202 itself may be specified or a replica 204/206 thereof may be specified. The shard 202 and its replica(s) 204/206 may be considered vertical partitions of the data store 200.

The tagging operation specifies the identifier of the current document. Therefore, when executing the tagging operation, the search engine is able to retrieve the current document by its identifier from the specified shard 202, or store the current document by its identifier in the specified shard 202. The tagging operation further specifies the identifier of the selected document 102A, and the metadata 104 (i.e., both the metadata 104A and 104B). Therefore, when executing the tagging operation, the search engine tags the current document with the metadata 104 and with the selected document 102A as the source 106A of this metadata 104 (by the identifier of the selected document 102A).

The tagging operation may specify that the search engine is to add metadata 104 to the current document only if the current document does not already include the metadata 104. Therefore, if the current document already includes the metadata 104A, the search engine does not add the metadata 104A to the current document, and likewise if the current document already includes the metadata 104B, the search engine does not add the metadata 104B to the current document. In this way, redundant or duplicative metadata tagging is avoided.

The tagging operation may similarly specify that the search engine is to add the selected document 102A as a source of the metadata 104A only if the metadata 104A does not already include the selected document 102A as a metadata source 106A. Therefore, if the metadata 104A of the current document already includes the selected document 102A as the source 106A, the search engine does not add the selected document 102A as the source 106A. Likewise, if the metadata 104B of the current document already includes the selected document 102A as the source 106A, the search engine does not add the selected document 102A as the source 106A. Redundant or duplicative metadata source tagging is thus also avoided.

The tagging operation can specify that the search engine is to index or reindex the current document with the added metadata 104 having the source 106A. The search engine may index the current document for the first time if the current document is being added to the data store 200. The search engine may reindex the current document if the current document is already in the data store 200. The tagging operation may specify that the search engine is to index or reindex the current document only if any metadata 104 was added to the current document and/or if the selected document was added as the source 106A of any metadata 104 within the current document. In this way, unnecessary document reindexing is avoided.

If the current document is the last related document 102 within the hierarchy 100 as it pertains to the selected document 102A (312), the method 300 includes then advancing the current document the next related document 102 (314), and repeating part 310 to generate a tagging operation for the new current document. If the current document is the last related document 102 within the hierarchy 100 as it pertains to the selected document 102A (312), then this means that tagging operations having been generated and added to the script for all such related documents 102. Therefore, the method 300 includes proceeding to transmit the generated script to the search engine for execution (316), to tag the related documents with the metadata 104 and with the selected document 102A as the source 106A of the metadata 104.

As noted, the method 300 is applicable to the case in which there are multiple selected documents. In this case, parts 302-312 can be repeated for each selected document before the method 300 concludes with transmitting the resulting script to the search engine for execution in part 316. For example, parts 302-312 may be repeated for the document 102B of FIG. 1 as the selected document once parts 302-312 have been performed for the document 102A as has been described. In this case, the hierarchy 100 as it pertains to the document 102B includes the documents 102B, 102C, 102D, and 102E, which are each tagged with the metadata 104B with the document 102B as the source 106B.

Figure 4A:
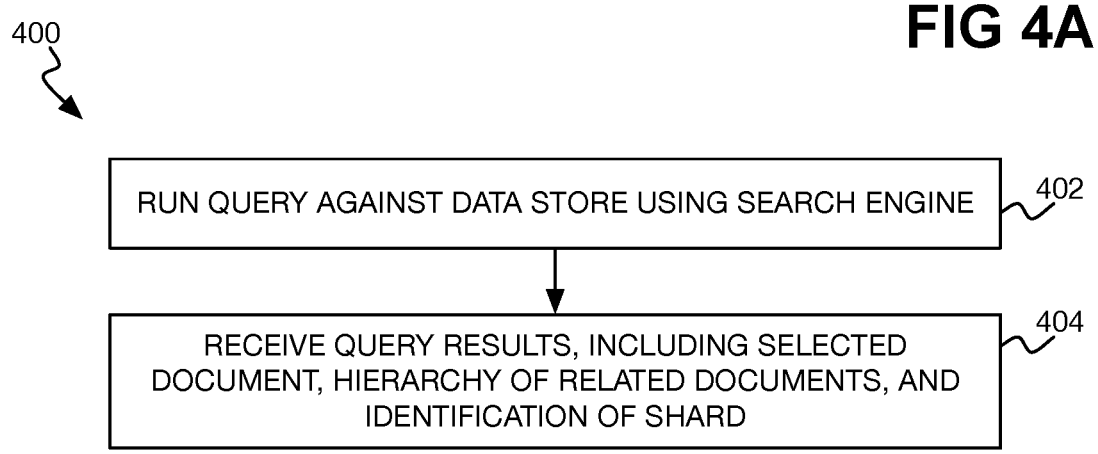
FIG. 4A is a flowchart of an example method for identifying a selected document and a shard of a data store of a search engine in which a hierarchy of related documents including the selected document are stored, in a case in which the related documents are already stored in the data store.

FIG. 4A shows an example method 400 for identifying a selected document and a shard of a data store of a search engine in which a hierarchy of related documents including the selected document are stored. The method 400 can be performed prior to the method 300 of FIG. 3, in the case in which the related documents are already stored in the data store 200. Like the method 300, the method 400 can be implemented as program code stored on a non-transitory computer-readable data storage medium and executable by a processor of a computing device.

The method 400 includes running a query against the data store 200 using the search engine (402), and receiving query results back from the search engine (404). The query results identify one or multiple selected documents. For each selected document, the query results identify the hierarchical path of the selected document and thus the hierarchy of related documents including the selected document. The query results likewise identify for each selected document the shard of the data store in which the selected document and the other related documents are stored. The method 300 of FIG. 3 can then be performed in relation to each selected document.

For example, the query may specify that the search engine return every document that is a spreadsheet. The search engine will therefore return the document 102B of FIG. 1, and the shard 202 of the data store 200 in which this selected document 102B is stored. The search engine will also return the hierarchical path of the document 102B, and as such will return the hierarchy 100 as it pertains to the document 102B. That is, the hierarchical path of the document 102B indicates that the document 102C contains the document 102B, that the document 102D contains the document 102C, and that the document 102E contains the document 102D. With this information, the method 300 of FIG. 3 can then be performed in relation to the document 102B as the selected document.

Figure 4B:
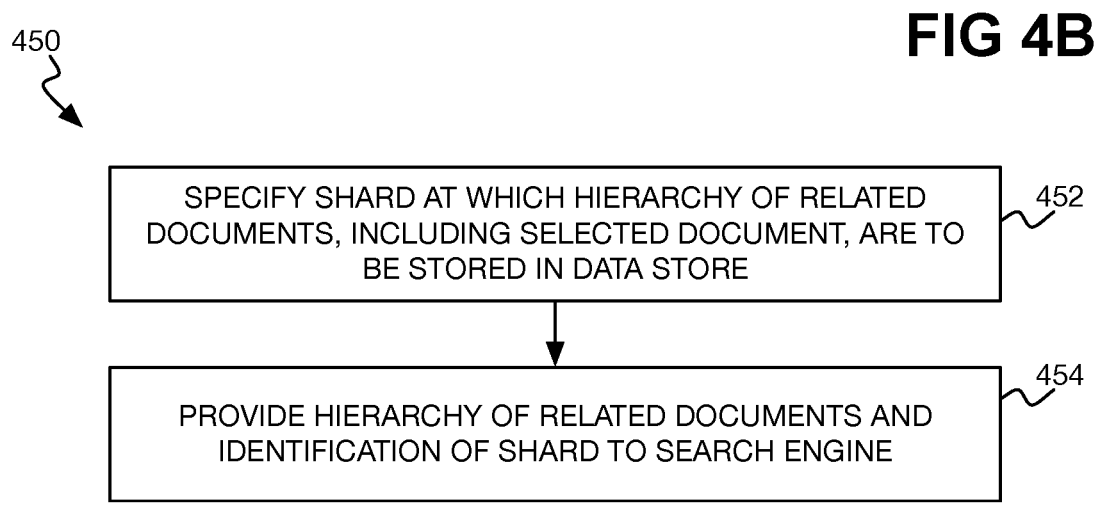
FIG. 4B is a flowchart of an example method for identifying a selected document and a shard of a data store of a search engine in which a hierarchy of related documents including the selected document are to be stored, in a case in which the related documents are not yet stored in the data store.

FIG. 4B shows an example method 450 for identifying a selected document and a shard of a data store of a search engine in which a hierarchy of related documents including the selected document are to be stored. The method 450 can be performed in conjunction with the method 300 of FIG. 3, in the case in which the related documents are not yet stored in the data store. Like the method 300, the method 450 can be implemented as program code stored on a non-transitory computer-readable data storage medium and executable by a processor of a computing device.

The method 450 includes specifying the shard of the data store of the search engine at which the hierarchy of related documents, including the selected document, are to be stored (452). Because the search engine has not yet stored the selected document and the other related documents of the hierarchy as it pertains to the selected document, the shard of the data store can thus be specified in advance, such as by a user or programmatically. For example, the shard of the data store that is least burdened in terms of storage space or other utilization metric may be selected, or the shard that is physically closest to the location of the computing device or user at which the related documents will most likely be retrieved may be selected.

The method 450 includes then providing the hierarchy of related documents, including the selected document, as well as identification of the specified shard, to the search engine (454). The related documents and the specified shard may be provided to the search engine at the same time as the generated script is transmitted to the search engine in the method 300 of FIG. 3. The search engine may tag the related documents in accordance with the generated script prior to storing the tagged documents in the specified shard, or may first store the documents in the shard before executing the script to tag the documents.

For example, the selected document may be the document 102B of FIG. 1. The hierarchy 100 of related documents 102 as it pertains to this selected document 102B includes the document 102B itself, the document 102C containing the document 102B, the document 102D containing the document 102C, and the document 102E containing the document 102D. The hierarchy of these related documents 102 are therefore provided to the search engine, along with the shard 202 at which the documents 102 are to be stored in the data store 200 of the search engine.

FIG. 5A shows an example method 500 for executing a tagging operation of a generated script to tag a related document of a hierarchy of related documents with metadata in a data store of a search engine and with a selected document of the related documents as a source of the metadata. The method 500 pertains to the case in which the related documents are already stored in the data store 200. The method 500 is performed by the search engine itself. For instance, the method 500 is performed for each tagging operation of the script generated by the method 300 of FIG. 3. Stated another way, a tagging operation of the generated script specifies that the search engine perform the method 500.

The method 500 is particularly described in relation to selectively tagging the document 102C of FIG. 1 with the metadata 104 (i.e., both the metadata 104A and 104B) and with the document 102A as the source 106A of the metadata 104. That is, there is a tagging operation in the script for the document 102C as a related document of the hierarchy 100 as it pertains to the selected document 102A that is the source 106A of the metadata 104. (The script also includes tagging operations for the other documents 102A, 102D, and 102E of the hierarchy 100 as it pertains to the selected document 102A, and the method 500 is thus repeated for each such tagging operation.)

The method 500 includes retrieving the related document 102C, which is specified by its identifier in the tagging operation, from the shard 202 of the data store 200 that the tagging operation also specifies (502). The tagging operation specifies each of the metadata 104A and 104B to be added to the document 102C. The method 500 includes setting the current metadata to the first such specified metadata 104 (either the metadata 104A or the metadata 104B) (504).

The method 500 includes determining whether the related document 102C retrieved from the data store 200 already includes the current metadata (506). If the related document 102C does not already include the current metadata (508), the method 500 includes then adding the current metadata to the related document 102C (510). However, if the related document 102C already includes the current metadata (508), the method 500 includes then determining whether the current metadata includes the selected document 102A, which is specified by its identifier in the tagging operation, as the source 106A of the current metadata (512).

If the current metadata does not already include the selected document 102A as the source 106A (514), the method 500 includes then adding the selected document 102A as the source 106A of the current metadata within the related document 102C (516). The selected document 102A is also added as the source 106A of the current metadata if the current metadata was just added to the related document 102C in part 510, since the current metadata will not have any sources when first added. The method 500 is finished with the current metadata either after the selected document 102A is added as the source 106A of the current metadata, or if the current metadata already includes the current metadata as the source 106A (514).

If the current metadata is not the last metadata specified by the tagging operation (518), the method 500 includes then advancing the current metadata to the next metadata specified by the tagging operation (520), and repeating at part 506 for the new current metadata. For example, as to the metadata 104, if the metadata 104A is the first metadata, then the method 500 is repeated at part 506 for the metadata 104B as the current metadata. Likewise, if the metadata 104B is the first metadata, then the method 500 is repeated at part 506 for the metadata 104A as the current metadata.

If the current metadata is the last metadata (518), then this means that every metadata specified by the tagging operation has been processed. If any metadata 104 has been added to the related document 102C, or if the selected document 102A has been added as the source 106A to any metadata 104 (522), the method 500 includes then reindexing the related document 102C (524) so that the related document 102C is queryable by the metadata 104 with the search engine. After the related document 102C has been reindexed, or if no metadata 104 has been added to the related document 102C or the selected document 102A has not been added as the source 106A to any metadata 104 (522), the method 500 is finished as to the tagging operation in question (526).

The method 500 therefore reindexes the related document 102C at most once, just if the document 102C was tagged with any metadata 104 and/or if the selected document 102A was added as the source 106A to any metadata 104 within the document 102C. This avoids unnecessarily reindexing the document 102C if the document 102C has not been updated, improving performance. Further, each metadata 104 is added to the document 102C just if the document 102C does not already include the metadata 104, which avoids redundancy. Similarly, the selected document 102A is added as the source 106A to each metadata 104 in the document 102C just if the metadata 104 does not already include the selected document 102A as the source 106, which also avoids redundancy.

FIG. 5B shows an example method 550 for executing a tagging operation of a generated script to tag a related document of a hierarchy of related documents with metadata in a data store of a search engine and with a selected document of the related documents as a source of the metadata. The method 550 pertains to the case in which the related documents are not already stored in the data store 200. Like the method 500, the method 550 is performed by the search engine itself. For instance, the method 550 is performed for each tagging operation of the script generated by the method 300 of FIG. 3. That is, a tagging operation of the generated script specifies that the search engine perform the method 550.

The method 550 is particularly described in relation to selectively tagging the document 102C of FIG. 1 with the metadata 104 (i.e., both the metadata 104A and 104B) and with the document 102A as the source 106A of the metadata 104, and in relation to adding the tagged document 102C to the data store 200. That is, there is a tagging operation in the script for the document 102C as a related document of the hierarchy 100 as it pertains to the selected document 102A that is the source 106A of the metadata 104. (The script also includes tagging operations for the other documents 102A, 102D, and 102E of the hierarchy 100 as it pertains to the selected document 102A, and the method 550 is thus repeated for each such tagging operation.)

The method 550 includes receiving the related document 102C, which is specified by its identifier in the tagging operation, as well as identification of the shard 202 of the data store 200 at which the related document 102C is to be stored (552). The tagging operation specifies that each of the metadata 104A and 104B be added to the document 102C. The method 550 includes setting the current metadata to the first such specified metadata 104 (either the metadata 104A or the metadata 104B) (554).

The method 550 includes adding the current metadata to the related document 102C (556). The method 550 also includes adding the selected document 102A, which is specified by its identifier in the tagging operation, as the source 106A of the current metadata (558). Because the related document 102A has not yet been stored in the data store 200 of the search engine, the document 102A will not yet have been tagged by the search engine. Therefore, the method 550 does not have to first check whether the related document 102C includes the current metadata and includes the selected document 102A as the source 106A of the current metadata, unlike in the method 500 of FIG. 5A.

If the current metadata is not the last metadata specified by the tagging operation (560), the method 550 includes then advancing the current metadata to the next metadata specified by the tagging operation (562), and repeating at part 556 for the new current metadata. If the current metadata is the last metadata (560), then this means that every metadata specified by the tagging operation has been processed. The method 550 includes proceeding with storing the related document 102C within the data store 200 at the shard specified by the tagging operation (564), and indexing the related document 102C for the first time (566) so that the related document 102C is queryable by the metadata 104 with the search engine.

Techniques have been described for tagging documents within a data store 200 of a search engine with metadata and with sources of the metadata. Once tagged, the documents can be searched (i.e., queried) with the search engine by their tagged metadata. The described techniques do not unnecessarily burden the search engine, in that a document is not reindexed unless it has been newly tagged with metadata or with a metadata source. The described techniques further avoid tagging redundancy, in that a document is not tagged with metadata if it is already tagged with the metadata and is not tagged with a source of the metadata if it is already tagged with this metadata source.

We claim:

1. A non-transitory computer-readable data storage medium storing program code executable by a processor to perform processing comprising:

identifying a shard of a selected document to be tagged with metadata in a data store of a search engine so that a hierarchy of related documents including the selected document is queryable by the metadata using the search engine, the shard specifying a location of the related documents within the data store of the search engine;

for each related document, generating a tagging operation within a script, the tagging operation specifying the metadata, the shard, an identifier of the related document, and an identifier of the selected document; and transmitting the script including the generated tagging operation for each related document to the search engine to execute to tag the related documents in the data store with the metadata and with the selected document as a source of the metadata.

2. The non-transitory computer-readable data storage medium of claim 1, wherein the processing further comprises:

identifying a hierarchical path of the selected document that specifies the hierarchy of related documents.

3. The non-transitory computer-readable data storage medium of claim 2, wherein the processing further comprises:

extracting the identifier of each related document from the identified hierarchical path of the selected document.

4. The non-transitory computer-readable data storage medium of claim 1, wherein the processing further comprises:

determining the hierarchy of related documents, including the selected document; and determining the identifier of each related document.

5. The non-transitory computer-readable data storage medium of claim 1, wherein the shard of the selected document is a selected partition of a plurality of partitions in which the related documents, including the selected document, are stored.

6. The non-transitory computer-readable data storage medium of claim 1, wherein the tagging operation for each related document specifies that the search engine is to add the metadata to the related document only if the related document does not already include the metadata, and wherein the tagging operation for each related document specifies that the search engine is to add the selected document as the source of the metadata only if the metadata does not already include the selected document as the source of the metadata.

7. The non-transitory computer-readable data storage medium of claim 6, wherein the tagging operation for each related document specifies that the search engine is to index or reindex the related document only if the metadata was added and/or the selected document was added as the source of the metadata.

8. The non-transitory computer-readable data storage medium of claim 1, wherein the metadata is one of a plurality of metadata with which the selected document is to be tagged, and wherein the tagging operation for each related document specifies the plurality of metadata.

9. The non-transitory computer-readable data storage medium of claim 1, wherein the selected document is one of a plurality of selected documents, and wherein identifying the shard and, for each related document, generating the tagging operation within the script are repeated for each of the plurality of selected documents.

10. The non-transitory computer-readable data storage medium of claim 1, wherein the selected document is already stored in the data store, the processing further comprising:

running a query against the data store using the search engine, the search engine returning query results identifying the selected document, the hierarchy of related documents, and the shard.

11. The non-transitory computer-readable data storage medium of claim 1, wherein the selected document is not yet stored in the data store, the processing further comprising:

providing the selected document, the hierarchy of related documents, and the shard at which the selected document is to be stored, to the search engine.

12. The non-transitory computer-readable data storage medium of claim 11, wherein the selected document is provided to the search engine at a same time as the script is transmitted to the search engine.

13. The non-transitory computer-readable data storage medium of claim 1, wherein the search engine is a distributed search engine.

14. The non-transitory computer-readable data storage medium of claim 13, wherein the search engine is an ELASTICSEARCH search engine.

15. The non-transitory computer-readable data storage medium of claim 14, wherein the script is a Painless scripting language script.

16. A method comprising:

retrieving, by a search engine, a related document having an identifier specified by a tagging operation within a script, from a shard of a data store of the search engine specified by the tagging operation;

determining, by the search engine, whether the related document already includes metadata specified by the tagging operation;

in response to determining that the related document does not already include the metadata, adding, by the search engine, the metadata to the related document and adding, by the search engine, a selected document having an identifier specified by the tagging operation as a source of the metadata;

in response to determining that the related document already includes the metadata:

determining, by the search engine, whether the metadata already includes the selected document as the source of the metadata; and in response to determining that the metadata does not already include the selected document as the source of the metadata, adding, by the search engine, the selected document as the source of the metadata; and reindexing, by the search engine, the related document only if the metadata was added and/or the selected document was added as the source of the metadata, so that the related document is queryable by the metadata using the search engine.

17. The method of claim 16, wherein the metadata is one of a plurality of metadata specified by the tagging operation, and wherein, for each metadata of the plurality of metadata, the search engine adds the metadata to the related document only if the related document does not already include the metadata, and adds the selected document as the source of the metadata only if the metadata does not already include the selected document as the source of the metadata.

18. The method of claim 17, wherein the search engine reindexes the related document at most once, and only if any metadata of the plurality of metadata was added and/or the selected document was added as the source of any metadata of the plurality of metadata.

19. A method comprising:

receiving, by a search engine, a related document and identification of shard of a data store of the search engine at which the related document is to be stored;

storing, by the search engine, the related document at the shard;

adding, by the search engine, metadata specified by a tagging operation within a script to the related document, the related document having an identifier specified by the tagging operation;

adding, by the search engine, a selected document having an identifier specified by the tagging operation as a source of the metadata; and indexing, by the search engine, the related document with the added metadata so that the related document is queryable by the metadata using the search engine.

20. The method of claim 19, wherein the metadata is one of a plurality of metadata specified by the tagging operation, wherein, for each metadata of the plurality of metadata, the search engine adds the metadata to the related document and adds the selected document as the source of the metadata, and wherein the search engine indexes the related document once, after each metadata of the plurality of metadata was added to the related document and after the selected document was added as the source of each metadata.

* * * * *